Figure 1:
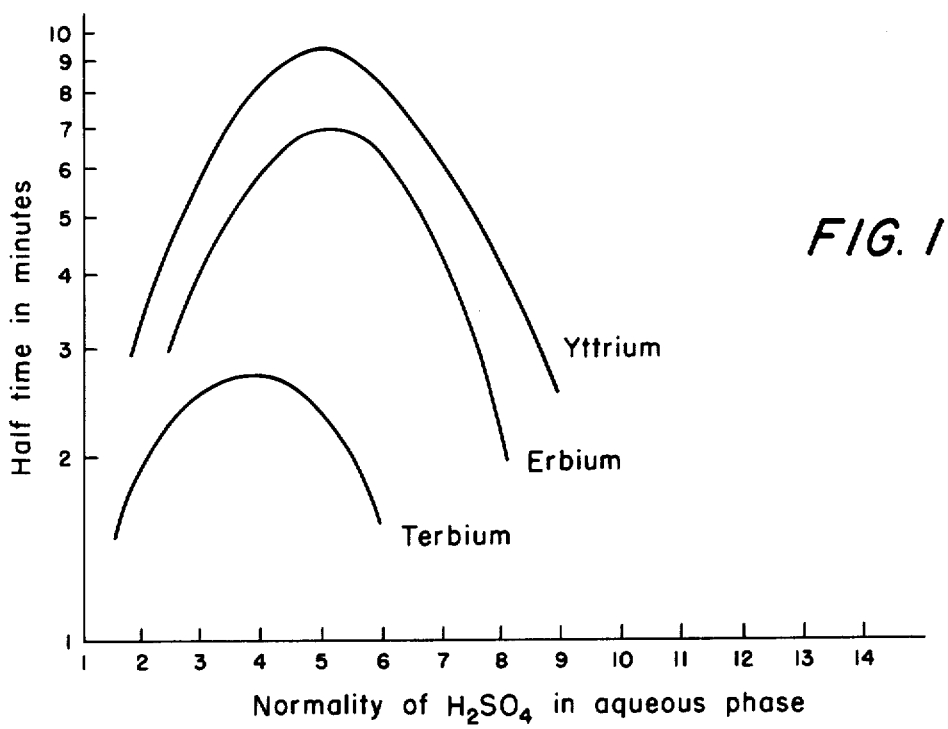

United States Patent [19]

Alstad et al.

[11] 4,041,125

[45] Aug. 9, 1977

[54] PROCESS FOR SEPARATION OF THE LANTHANIDES

[75] Inventors: Jorolf Alstad, Oslo; Leif Farbu, Strommen, both of Norway

[73] Assignee: Forskningsgruppe for Sjeldne Jordarter, Oslo, Norway

[21] Appl. No.: 688,046

[22] Filed: May 19, 1976

Related U.S. Application Data

[63] Continuation-in-part of Ser. No. 478,357, June 11, 1974, abandoned.

[30] Foreign Application Priority Data

June 15, 1973  Norway ............................... 732492

[51] Int. Cl.² .......................................... C01F 17/00
[52] U.S. Cl. ................................ 423/21; 75/101 BE
[58] Field of Search ................. 423/21, 263, 658.5; 75/101 BE

[56] References Cited

U.S. PATENT DOCUMENTS

| | | | |
|---|---|---|---|
| 2,955,913 | 10/1960 | Peppard et al. | 423/21 |
| 3,110,556 | 11/1963 | Peppard et al. | 423/21 |
| 3,812,232 | 5/1974 | Bauer et al. | 423/21 |

Primary Examiner—Herbert T. Carter
Attorney, Agent, or Firm—Eyre, Mann, Lucas & Just

[57] ABSTRACT

An improved liquid-liquid extraction process for the separation of the elements of the lanthanide series is disclosed. The process involves dissolving the lanthanides in a sulfuric acid solution to form rare earth sulfates whereafter the solution is contacted with an organic solvent immiscible with water and containing di(2-ethylhexyl) phosphoric acid whereby the lanthanides are separated from impurities and at least some of the lanthanides are extracted into the organic phase. Thereafter, the organic and aqueous phases are separated and the organic phase containing the impurities-separated lanthanides is subjected to a back extraction with an aqueous phase comprising an aqueous solution with sulfuric acid. The contact time between the aqueous and organic phases in the back extraction is regulated so that a desired or desired elements of the lanthanides are back extracted into the aqueous phase. The contact time is controlled and is less than the total extraction equilibrium time between the phases. The organic and aqueous solution concentrations are also controlled. After a predetermined contact time, the aqueous and organic phases are immediately separated.

3 Claims, 2 Drawing Figures

PROCESS FOR SEPARATION OF THE LANTHANIDES

This is a continuation-in-part application of application Ser. No. 478,357, filed June 11, 1974 and now abandoned.

The present invention relates to liquid-liquid extraction processes for separating rare earth elements from each other. It is more particularly concerned with utilizing the separation factors of the elements in specific solutions to preferentially extract one or some of the rare earths while leaving others.

As used herein, the terms "rare earth elements" and "lanthanides" are synonymous and include the elements of the lanthanide series (Atomic Numbers 57–71) together with yttrium. As is known, these elements occur together in nature and have highly similar chemical properties thus making it quite difficult to separate the elements by conventional techniques. As is also known, the demand for various of the rare earth elements is steadily increasing and thus the need for separating them correspondingly increases. Many processes for separating rare earth elements have been evolved, some of which employ liquid-liquid extraction techniques. However, in order to effect a good separation of the elements of the lanthanide series, a high consumption of chemicals is usually encountered and it is usually also necessary to go through a number of separate extraction steps, as taught in U.S. Pat. No. 3,110,556. One such prior art process is disclosed in U.S. Pat. No. 2,995,913, which patent teaches that the quantity of particular lanthanide elements extracted to total extraction equilibrium between mineral acid solutions and aqueous solutions varies in accordance with element atomic number and solution composition and concentration. U.S. Pat. No. 3,110,556 similarly teaches use of the interrelation between quantity extracted to total extraction equilibrium and atomic number to separate the lanthanide elements. While the liquid-liquid extraction techniques disclosed in U.S. Pat. No. 3,110,556 involve the use of di(2-ethylhexyl) phosphoric acid as the extractant in the organic phase, and while this has proved to be a useful extractant, it is still an extractant which, in the process disclosed therein requires a relatively large number of extraction steps in order to obtain the purity of the product necessary for commercial uses. U.S. Pat. No. 3,812,232 also discloses the use of di(2-ethylhexyl) phosphoric acid as the extractant in the organic phase of a liquid-liquid extraction process and teaches selective stripping of individual lanthanide metals into an aqueous phase after an initial total extraction into an organic phase. Inherent in the selective stripping is total extraction equilibrium between the phases. Also in the known processes, typically the two liquid phases are mixed by means of stirring or the like until total extraction equilibrium is obtained between the phases. This is typically the way a partial separation is obtained, as the lighter rare earths preferably will remain in the aqueous phase, while the heavier rare earths and yttrium will be extracted to the organic phase to a far greater degree than the lighter rare earths.

It is known that the separation factor for two substances is the ratio between their distribution ratios. For example, the separation factor between two substances A and B, α A/B, is the ratio between their distribution ratios, DA/DB. As used herein, the distribution ratio for a particular substance is the ratio between the concentration of the substance in the organic phase and the concentration of the substance in the aqueous phase.

In accordance with the present invention, the applicants have found that separation factors can be used to advantage in separation of rare earth elements. The reason for this is that the extraction rate for the various lanthanide metal sulfates between an aqueous phase and an organic phase will be different for different elements. Contrary to extraction equilibrium techniques, the contact time between the two phases of less than the time to total extraction equilibrium between the phases can thus be controlled so that there is a high distribution ratio for those elements which are extracted rapidly and a low distribution ratio for those elements which are extracted slowly. When the predetermined time of less than the time to total extraction equilibrium between the phases to effect the desired distribution ratio has elapsed, the liquid phases are immediately separated. Thereafter, taking advantage of the fact that some of the metal elements extracted into the organic phase will have a higher extraction rate when again contacted with a dilute sulfuric acid solution, and dependent upon the sulfuric acid concentration, the organic phase can be back-extracted, again controlling the contact time between the two phases to less than the time to total extraction equilibrium, and thereafter immediately separating the phases.

In order to minimize waste of the portion of the rare earth elements extracted into the organic phase and then back-extracted into the aqueous phase, the organic phase can be removed after stripping with a strong acid (e.g., 10 N sulfuric acid) and lye whereupon the phase may be regenerated and returned to the first extraction step.

Accordingly, the present invention provides a process which efficiently separates the lanthanide elements without a large consumption of chemicals or a large number of extraction steps.

In accordance with the present invention, the mixture of rare earth elements if first dissolved in an aqueously diluted sulfuric acid solution to form rare earth sulfates. The aqueous solution of rare earth sulfates is then contacted with a second solution comprising an organic solvent substantially immiscible with water and containing di(2-ethylhexyl) phosphoric acid (hereinafter HDEHP). Suitable for use as the organic solvent are the paraffinic liquids, e.g. hexane. The contact between the two liquids is maintained for a predetermined period of time until the desired extraction is attained. In accordance with the present invention, the contact time may be controlled to be less than the time for total extraction equilibrium for the phases. Thereafter the liquids are separated. This single extraction step, even controlling the contact time to preferentially extract a desired element or elements, does not usually produce a sufficiently pure lanthanide metal. Further in accordance with the invention, after the organic and aqueous phases have been separated, the organic phase is back-extracted with aqueously diluted sulfuric acid solutions to extract one or some of the metals from the organic phase. It has been found that use of particular concentrations of sulfuric acid in combination with the duration of the contact time of the phases for periods of less than the time of total extraction equilibrium between the phases not only has considerable influence on separation factors of the lanthanide elements, but also determines which and how much of the particular lanthanide element or elements are separated. Because a single extraction step is usually not sufficient, as described hereinbefore, it is preferred to extract substantially all the lanthanide elements into the organic phase to thereby separate these elements from impurities.

Referring now to the extraction rate for the rare earths, for a given concentration of acid in the aqueous phase, the speed of the transfer of a rare earth metal from one phase to the other will be dependent on the metal in question. If the concentration of the metal C in question in a phase at a given time is $t$, and the concentration of the same metal in the phase at total equilibrium is $C_\infty$, the difference $C-C_\infty$ will decrease exponentially with the length of that period in which the phases are in contact. It is convenient to talk of these periods in terms of the halftime for extraction of a particular rare earth depending on the acid concentration. The halftime is that time in which half of the quantity of the particular rare earth element will be extracted from one phase into the other. The halftime will be different depending upon the particular metal and, as previously mentioned will vary according to the acid concentration in the aqueous phase.

Typical time rates for sulfuric acid are shown in FIG. 1 of the drawings. In this figure is shown the halftime in minutes of the elements terbium, erbium, and yttrium for back extraction from the organic phase (into which they have been extracted with HDEHP) into an aqueous phase containing sulfuric acid and depending on the concentration of sulfuric acid. While time rates have only been shown for terbium, erbium, and yttrium, it is to be understood that the times for the other rare earth elements are known or will be apparent to those skilled in the art.

The invention may be further understood with reference to the following specific example of separation according to the instant invention made for purposes of illustrating applicants' best mode of practicing his invention.

A mixture of rare earth elements including impurities was dissolved in an aqueous solution 1.5N in sulfuric acid to form rare earth sulfates. Under these conditions, the separation between the heavy and light lanthanides is such that the separation point, where the distribution coefficient $D = 1$, is located somewhere in the middle range of the lanthanides, depending somewhat on the concentration of metal. At this concentration of sulfuric acid the reaction speed has been found to be comparatively quick for all rare earths. This solution was contacted with an organic phase immiscible with water and being 1M in HDEHP. At this particular concentration of sulfuric acid and HDEHP, all of the rare earth elements were rapidly extracted into the organic phase, leaving the impurities in aqueous phase. The two phases were then separated.

Figure 2:
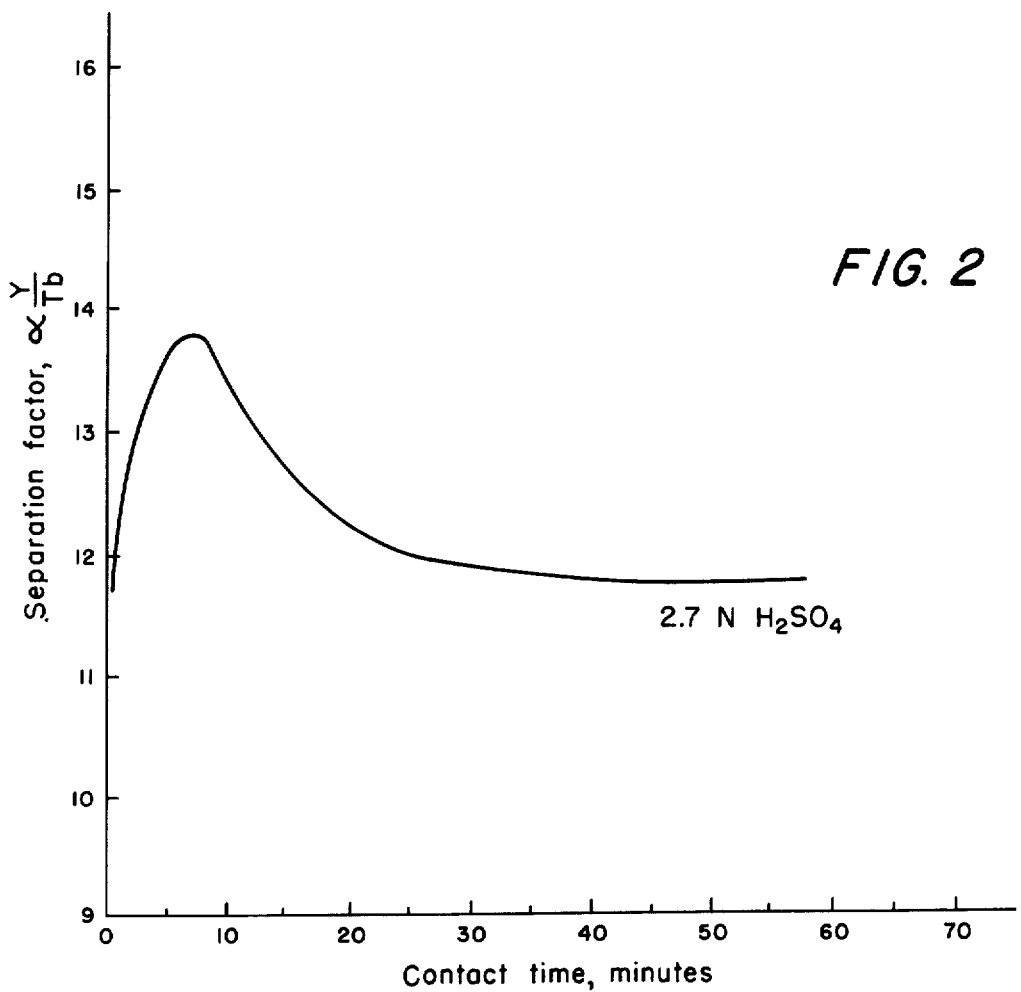

Thereafter, the pregnant organic phase was backextracted with an aqueously diluted sulfuric acid phase. In this particular example it was desired to separate terbium from yttrium and, in accordance with the present invention, this was done by controlling the normality of the sulfuric acid and the contact time of the phases. Utilizing 2.7N sulfuric acid, the separation factors between yttrium and terbium are shown in FIG. 2 of the drawings. As there shown, a contact time of six minutes will increase the separation factor from the equilibrium separation factor of 11.7 to 13.7, an increase of 17%. In the actual test, a contact time of six minutes was used whereby terbium was back-extracted close to its equilibrium value in the aqueous phase while the yttrium was retained in the organic phase at close to its initial value.

The mixing and separating of the phases and contact time may be controlled and calculated as follows. A static mixer is connected to a centrifuge and each of the two liquid phases are introduced into the static mixer by means of separate adjustable pumps. The flow of liquids is controlled by flow meters and can be adjusted in relation each to the other, for example, in ratios from 1:2 to 2:1. The dimensions of the static mixer, which are adjustable, and the sum of the speeds of flow of the two liquid phases will determine the retention time required of the liquids in the mixer. This retention time, considering a short additional retention time in the centrifuge, will represent the contact time between the phases. For a given desired contact time and a given speed of flow, the dimensions of the static mixture may be determined. The desired contact time is determined by the rare earths to be separated and their respective speeds of extraction. In FIG. 1, as described hereinbefore, the extraction time for terbium, yttrium and erbium are plotted in the form of half time $T\frac{1}{2}$ as a function of the concentration of $H_2SO_4$ in the aqueous phase. The speed constant is related to the halftime by the following equation.

$$\lambda = 0.693/T_{1/2}$$

If the distribution ratio (D) for equilibrium is indicated by $D_{eq}$ and the distribution ratio at contact time $t$ by $D_t$, the extraction may be described by the following equations.

$$D_t = \frac{D_{eq}(1 - e^{-\gamma t})}{1 + D_{eq}(e^{-\gamma t})} \text{ for extraction;}$$

$$\text{and } D_t = \frac{D_{eq} + e - \gamma^t}{1 - e^{-\gamma^t}} \text{ for back-extraction;}$$

where $e$ is the natural logarithm base.

At $t = 0$ the rare earth metal is in the aqueous phase before extraction ($D = 0$) and is in the organic phase before backextraction ($D = \infty$). For any rare earths A, B, etc., the different constant of speed of extraction will be $\lambda_A$, $\lambda_B$, etc. and are known. The time depending distribution ratio $D_t$ will thus be different for the two rare earths and the separation factor will vary with the contact time as described hereinbefore. Since the values of $\lambda_A$, $\lambda_B$, etc. are known, the time depending distributions for the rare earths $D_{tA}$, $D_{tB}$, etc. and the separation factors $D_{tA}/D_{tB}$, etc. may be calculated as function of the contact time t. The desired contact time will correspond to an optimum raised separation factor (in relation to that of equilibrium) and can be found either graphically or by calculation. When the curves are obtained, as in FIG. 1, the process is applicable to all the rare earth elements. The speeds of extraction will vary depending on the rare earths so that the contact times will vary from 10 seconds to 100 minutes. Where long contact times are involved, it is preferred to use a mixer which includes a propeller in the mixing chamber. If desired, the rare earth concentration during extraction may be measured in each phase by appropriate indicators such as, for example, radioactive tracers.

While the separation factor/contact time relationships are characteristic for particular elements, that for yttrium and terbium has been disclosed for 2.7 N $H_2SO_4$ aqueous solution. FIG. 2 shows the relationship. The peak of the curve in FIG. 2 is located above the half time for terbium and below the half time for yttrium. The preferred contact time is consequently in this region. The separation factor/contact time relationships for other lanthanide elements and for other concentrations are known or will be apparent to those skilled in the art.

The advantages of the present invention, as well as certain changes and modifications of the disclosed embodiment thereof, will be readily apparent to those skilled in the art. It is the applicants' intention to cover by their claims all those changes and modifications which could be made to the embodiment of the invention herein chosen for the purposes of the disclosure without departing from the spirit and scope of the invention.

What is claimed is:

1. A liquid-liquid extraction process for the separation of yttrium from terbium comprising:
   a. admixing a mixture of rare earth elements including at least yttrium and terbium and impurities in aqueous solution with sulfuric acid to form an aqueous phase comprising an aqueous solution of rare earth sulfates including at least yttrium sulfate and terbium sulfate;
   b. contacting said aqueous phase with an organic phase comprising an organic solvent containing di(2-ethylhexyl) phosphoric acid, said organic solvent being substantially immiscible with water;
   c. maintaining the contact between the aqueous phase and the organic phase for a sufficient time so that substantially all of the yttrium and terbium are extracted into the organic phase;
   d. separating the aqueous phase from the organic phase;
   e. subjecting the separated organic phase of step (d) to a back extraction with an aqueous phase comprising an aqueous solution with sulfuric acid;
   f. regulating the time of contact between the separated organic phase and the back extraction aqueous phase to a period of less than the time to total extraction equilibrium for the phases and between the half time in minutes for the extraction of terbium from the separated organic phase into the back extraction aqueous phase and the half time in minutes for the extraction of yttrium from the separated organic phase into the back extraction aqueous phase; and
   g. separating the separated organic phase from the back extraction aqueous phase.

2. A liquid-liquid extraction process for the separation of yttrium from terbium comprising:
   a. admixing a mixture of rare earth elements including at least yttrium and terbium and impurities in aqueous solution 1.5N with sulfuric acid to form an aqueous phase comprising an aqueous solution of rare earth sulfates including at least yttrium sulfate and terbium sulfate;
   b. contacting said aqueous phase with an organic phase comprising an organic solvent which is 1M in di(2-ethylhexyl) phosphoric acid, said organic solvent being substantially immiscible with water;
   c. maintaining the contact between the aqueous phase and the organic phase for a sufficient time so that substantially all of the yttrium and terbium are extracted into the organic phase;
   d. separating the aqueous phase from the organic phase;
   e. subjecting the separated organic phase of step (d) to a back extraction with an aqueous phase comprising an aqueous solution 2.7N with sulfuric acid;
   f. regulating the time of contact between the separated organic phase and the back extraction aqueous phase to a period of less than the time to total extraction equilibrium for the phases and between the half time in minutes for the extraction of terbium from the separated organic phase into the back extraction aqueous phase and the half time in minutes for the extraction of yttrium from the separated organic phase into the back extraction aqueous phase; and
   g. separating the separated organic phase from the back extraction aqueous phase.

3. A liquid-liquid extraction process for the separation of yttrium from terbium comprising:
   a. admixing a mixture of rare earth elements including at least yttrium and terbium and impurities in aqueous solution 1.5N with sulfuric acid to form an aqueous phase comprising an aqueous solution of rare earth sulfates including at least yttrium sulfate and terbium sulfate;
   b. contacting said aqueous phase with an organic phase comprising on organic solvent which is 1M in di(2-ethylhexyl) phosphoric acid, said organic solvent being substantially immiscible with water;
   c. maintaining the contact between the aqueous phase and the organic phase for a sufficient time so that substantially all of the yttrium and terbium are extracted into the organic phase;
   d. separating the aqueous phase from the organic phase;
   e. subjecting the separated organic phase of item (d) to a back extraction with an aqueous phase comprising an aqueous solution 2.7N with sulfuric acid;
   f. regulating the time of contact between the separated organic phase and the back extraction aqueous phase to a period of six minutes; and
   g. separating the separated organic phase from the back extraction aqueous phase.

* * * * *